(12) United States Patent
Nurzia et al.

(10) Patent No.: US 12,304,279 B2
(45) Date of Patent: May 20, 2025

(54) SYSTEM AND A METHOD FOR MIXING AIR FOR A VEHICLE HVAC COMPONENT

(71) Applicant: KNORR-BREMSE ESPANA SA, Getafe (ES)

(72) Inventors: Giovanni Nurzia, Madrid (ES); Rafael Querencias Fernandez, Madrid (ES)

(73) Assignee: KNORR-BREMSE ESPANA SA (ES)

( * ) Notice: Subject to any disclaimer, the term of this patent is extended or adjusted under 35 U.S.C. 154(b) by 610 days.

(21) Appl. No.: 17/420,131

(22) PCT Filed: Dec. 30, 2019

(86) PCT No.: PCT/EP2019/087153
§ 371 (c)(1),
(2) Date: Jun. 30, 2021

(87) PCT Pub. No.: WO2020/141158
PCT Pub. Date: Jul. 9, 2020

(65) Prior Publication Data
US 2022/0088994 A1    Mar. 24, 2022

(30) Foreign Application Priority Data
Dec. 31, 2018 (EP) ..................................... 18215933

(51) Int. Cl.
*B60H 1/00* (2006.01)
*B61D 27/00* (2006.01)

(52) U.S. Cl.
CPC ..... *B60H 1/00828* (2013.01); *B60H 1/00371* (2013.01); *B61D 27/0018* (2013.01);
(Continued)

(58) Field of Classification Search
CPC ............ B60H 1/00828; B60H 1/00371; B60H 2001/00085; B60H 2001/00099; B61D 27/0018
See application file for complete search history.

(56) References Cited

U.S. PATENT DOCUMENTS

| | | | | |
|---|---|---|---|---|
| 4,727,728 A | * | 3/1988 | Brown ............... | B60H 1/00371 62/298 |
| 4,732,011 A | * | 3/1988 | Haiya ................ | B60H 1/00371 62/244 |

(Continued)

FOREIGN PATENT DOCUMENTS

| | | |
|---|---|---|
| CN | 108725129 A | 11/2018 |
| DE | 3545866 A1 * | 6/1987 |

(Continued)

*Primary Examiner* — Jorge A Pereiro
*Assistant Examiner* — Michael James Giordano
(74) *Attorney, Agent, or Firm* — Barnes & Thornburg LLP

(57) ABSTRACT

A system for mixing air for a vehicle HVAC (heating, ventilation, air-conditioning) component, includes a first inlet for outdoor air from an exterior space of the vehicle; a first fan in communication with the first inlet to control (only) an air inflow through the first inlet; a second inlet for indoor air from an interior space of the vehicle; and a second fan in communication with the second inlet to control (only) an air inflow through the second inlet. The first fan and the second fan are independently controllable to provide a desired mix of air to the vehicle HVAC component.

11 Claims, 8 Drawing Sheets

(52) U.S. Cl.
CPC .............. *B60H 2001/00085* (2013.01); *B60H 2001/00099* (2013.01)

(56)  References Cited

U.S. PATENT DOCUMENTS

| | | |
|---|---|---|
| 2010/0242513 A1 | 9/2010 | Nishino et al. |
| 2012/0214392 A1 | 8/2012 | Kanemaru |
| 2012/0247714 A1 | 10/2012 | Morris et al. |
| 2012/0247744 A1* | 10/2012 | Maehata ............ B60H 1/00828 165/200 |
| 2017/0190237 A1* | 7/2017 | Shingu ..................... F24F 11/89 |
| 2018/0134117 A1 | 5/2018 | Connell |

FOREIGN PATENT DOCUMENTS

| | | |
|---|---|---|
| DE | 19847504 C1 | 11/2000 |
| JP | H06143996 A | 5/1994 |
| WO | 2014147891 A1 | 9/2014 |

\* cited by examiner

SYSTEM AND A METHOD FOR MIXING AIR FOR A VEHICLE HVAC COMPONENT

CROSS REFERENCE AND PRIORITY CLAIM

This patent application is a U.S. National Phase of International Patent Application No. PCT/EP2019/087153 filed Dec. 30, 2019, which claims priority to European Patent Application No. 18215933.5, the disclosure of which being incorporated herein by reference in their entireties.

FIELD

Disclosed embodiments relate to a system and a method for mixing air for a vehicle HVAC component and, in particular, to an arrangement of outdoor and indoor air supply fans at an evaporator of railway HVAC units.

BACKGROUND

Vehicle air conditioners are used to maintain certain conditions of temperature, humidity and air quality in a specific compartment, like passengers' compartment in a train or in another vehicle. To perform their function, vehicle air conditioners take a certain quantity of air (which can also be equal to zero) coming from outside the vehicle (hereinafter referred to as outdoor air) and a certain quantity of air (which can also be equal to zero) coming from the compartment (hereinafter referred to as indoor air). Moreover, a quantity of air equal to the outdoor air is exhausted from the compartment from the vehicle.

SUMMARY

Disclosed embodiments relate to a system for mixing air for a vehicle HVAC (heating, ventilation, air-conditioning) component. The system comprises a first inlet for outdoor air from an exterior space of the vehicle, a first fan in communication with the first inlet to control (only) an air inflow through the first inlet, a second inlet for indoor air from an interior space of the vehicle, and a second fan in communication with the second inlet to control (only) an air inflow through the second inlet. The first fan and the second fan are independently controllable to provide a desired mix of air to the vehicle HVAC component.

BRIEF DESCRIPTION OF THE FIGURES

Some examples of the systems and/or methods will be described in the following by way of examples only, and with respect to the accompanying figures, in which.

DETAILED DESCRIPTION

As explained above, to perform the vehicle air conditioning function, vehicle air conditioners take a certain quantity of air (which can also be equal to zero) coming from outside the vehicle (hereinafter referred to as outdoor air) and a certain quantity of air (which can also be equal to zero) coming from the compartment (hereinafter referred to as indoor air). Moreover, a quantity of air equal to the outdoor air is exhausted from the compartment from the vehicle.

Figure 7A:
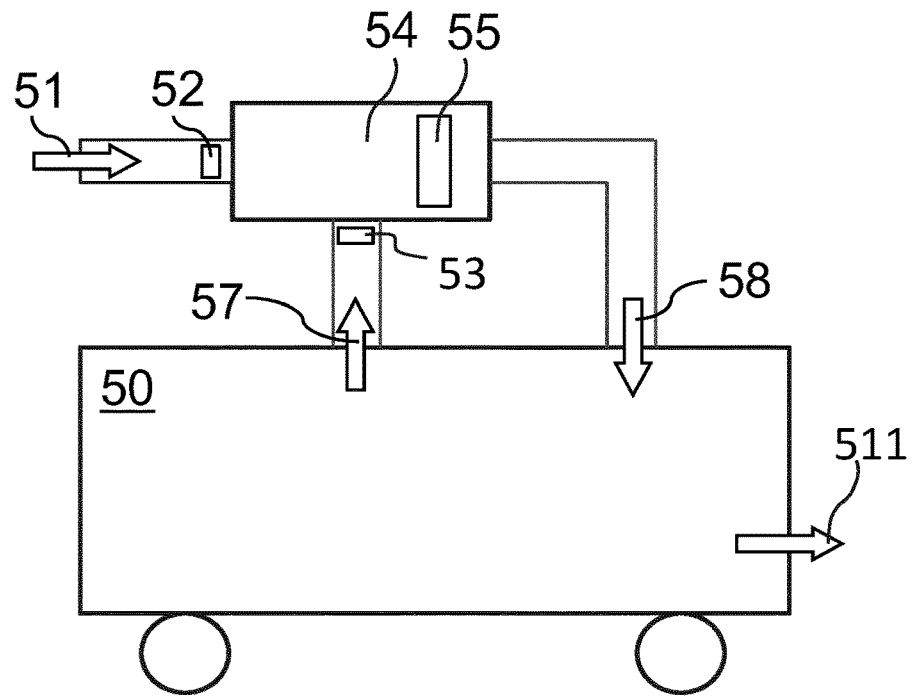
FIGS. 7A, 7B depict a conventional system for mixing air.

These air streams are schematically shown in FIG. 7A, where a part of an exemplary air conditioning (AC) system for a railway vehicle 50 is illustrated. The air conditioning system comprises an inlet for the outdoor air stream 51, a mixing zone 54, an inlet for the indoor air stream 57, an outlet for a supply air 58 directed into the compartment. Finally, an outlet for the exhaust air 511 is usually located in the vehicle's envelope. Indoor and Outdoor air 51, 57 are usually mixed in the mixing zone 54 before passing through various components 55 (such as filters, heat exchangers, electrical heaters, or other means) that allow changing temperature, humidity etc. of air before supplying it to the compartment. Outdoor air 51 is used to replace periodically the air volume inside passengers' compartment, while indoor air 57 is circulated to ensure that heat gain and loss are properly balanced by the AC system and indoor temperature is maintained within certain limits. The exhaust air 511 is extracted from the compartment, to let outdoor air in.

Figure 7B:
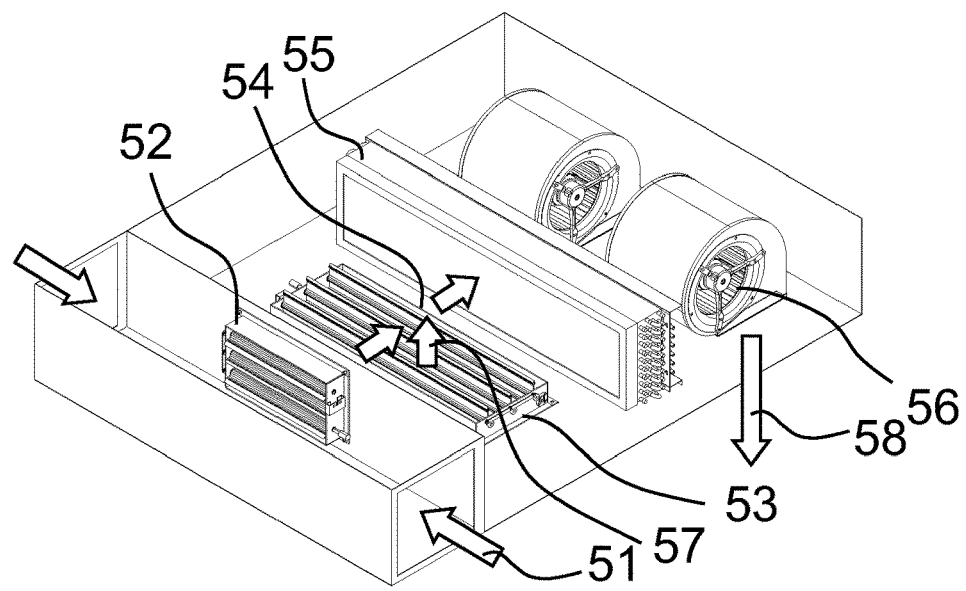

FIG. 7B shows further details of the conventional system, wherein an outdoor air damper 52 controls the outdoor air inflow 51 received from two side openings connected to an exterior space. In addition, an indoor air damper 53 controls the indoor air 57 from the inside (interior space). The mixed air in the mixing zone 54 is provided to the component 55 and reaches thereafter two fans 56 that power the air flow through the HVAC unit and supply the resulting air to the compartment through a ducting and distribution system.

To lower the energy consumption, the amount of outdoor air can be regulated depending on the occupation of the compartment. In case of low occupation, an outdoor air flow rate may be reduced down to a value which still ensures sufficient dilution of internal contaminants (mainly the $CO_2$ emitted by passengers). If outdoor air is hot (like in summer) or cold (like in winter) the AC system may see a reduction of the heat gain or heat loss coming from outside. Therefore, less energy will be needed to balance these loads.

Indoor air can also be regulated in some specific situations. For example, indoor air circulation shall be stopped when it brings no benefit, like in case of a fire inside the compartment or a failure of the AC cooling system. At the same time, the outdoor air intake can be increased. A conventional solution to allow outdoor and indoor air flow regulation is the use of air dampers as depicted in FIG. 7B, wherein the outdoor air damper 52 is located in the outdoor air stream 51. It can be closed/opened depending on the desired amount of outdoor air 51. Another air damper 53 can be located in the indoor air stream 57 which can be regulated to better adjust the share of outdoor and indoor air, or can be closed to avoid indoor air circulation.

This kind of arrangement, although widely employed, has some specific drawbacks:

First, various components should be installed to have an automated system. Dampers are typically made of a metal frame and a set of movable blades so that electrical motors are needed to open/close the dampers blades. This adds cost and weight to the equipment. Moreover, it needs specific maintenance.

Second, the proper regulation/controlling of such system requires some effort, as the pressure drop variations induced by the dampers are highly nonlinear. In practice, only few regulation operations are achievable and the target flowrate will not be obtained if the exact damper position is not reached.

Third, to change the operating point of the fans and the flow rate the dampers introduce a variable pressure drop (flow resistances) in the system. If for example the outdoor flow rate is decreased by closing the outdoor air damper, the fan power consumption has little variation.

Figure 8:
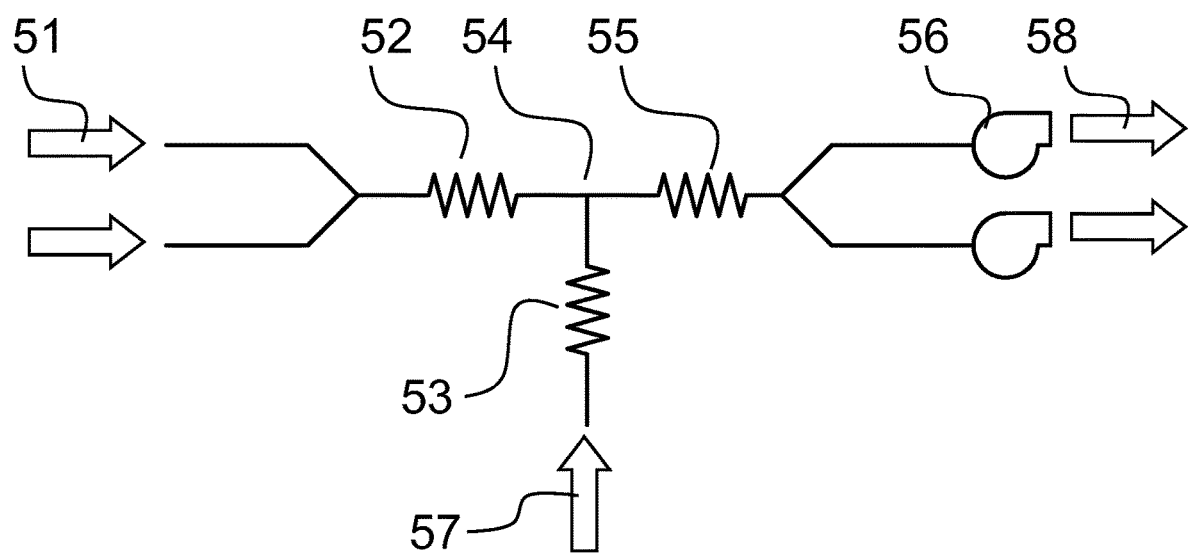
FIG. 8 illustrates the insufficient control of the conventional system as shown in FIGS. 7A, 7B.

FIG. 8 illustrates this insufficient control of outside air and inside air due to the dampers 52, 53 that limit the ability of providing the correct amount of outside air 51/inside air 57 as desired. The dampers are poorly controllable resistances against which the one or more fans 56 has/have to work. Apart from the insufficient level of control, the dampers 51, 53 result in an increased load on the fans 56. Further load is related to HVAC components 55 (such as filters, heat exchangers, electrical heaters . . . ) and several optional elements which are not described here (such as additional filters, other heat exchangers, ducting, obstructions and so on). They contribute likewise to the resistances, but depend on the features associated to a specific HVAC unit.

Therefore, there is a demand for a different design arrangement that provides an increased level of control while lowering the overall load on the system and thereby increasing the energy efficiency at lower costs of maintenance.

Disclosed embodiments relate to a system for mixing air for a vehicle HVAC (heating, ventilation, air-conditioning) component. The system comprises a first inlet for outdoor air from an exterior space of the vehicle, a first fan in communication with the first inlet to control (only) an air inflow through the first inlet, a second inlet for indoor air from an interior space of the vehicle, and a second fan in communication with the second inlet to control (only) an air inflow through the second inlet. The first fan and the second fan are independently controllable to provide a desired mix of air to the vehicle HVAC component.

Optionally, the first inlet comprises at least a first opening and a second opening (or more openings), which are each in communication with the first fan.

Optionally, the system comprises a third inlet for air from the exterior or interior space of the vehicle. The system may further comprise a third fan in communication with the third inlet to control an air inflow through the third inlet. The third fan may be controllable to provide the desired mix of air to the vehicle HVAC component.

Optionally, the system comprises a housing for accommodating at least the first fan, the second fan, and the HVAC component. In addition, the system includes a mixing zone arranged inside the housing downstream of the first fan and the second fan and upstream of an accommodation place of the HVAC component. The indoor and outdoor air streams are mixed together in this zone and a uniform air temperature is achieved before reaching the HVAC component.

Optionally, the second inlet may be provided upstream of the vehicle HVAC component and the second fan may be provided downstream of the vehicle HVAC component. Therefore, the second fan can suck air from the second inlet through the vehicle HVAC component. This provides the advantage that the first fan can be used to blow air directly through the second inlet into the exemplary passenger compartment—without passing through the HVAC component. Therefore, a large volume of outside air can easily be supplied directly into the indoor region.

Optionally, the first fan and/or the second fan and/or the third fan are electronically commutated and include at least one brushless direct current motor. This provides the advantage of an improved controlling of the amount of air (e.g. by a voltage signal).

Optionally, the fans are backward curved impellers, without casing, to promote a high degree of mixing between indoor and outdoor air streams, as well as a uniform air speed on the HVAC component. Therefore, the whole HVAC component works in a efficient way and zones of either too high or too low speed are avoided.

Further embodiments relate to a vehicle HVAC (heating, ventilation, air-conditioning) unit, which includes at least one HVAC component, a system as described before for providing a mix of air to the at least one HVAC component, and at least one supply opening for supplying an output of the HVAC component to a vehicle compartment.

Optionally, the at least one HVAC component includes one or more of the following: a heater, a heat exchanger, a vent, an air-conditioner, an air filter, or other components used in a HVAC unit.

Optionally, the at least one HVAC component comprise two same or different components (e.g. two identical or different heater or filter or heat exchanger etc.). The at least one supply opening may comprise two openings, each of which is in communication to one of the two HVAC components and is connected to one or more vehicle compartments.

Embodiments relates also to a vehicle, in particular a railway vehicle, with a vehicle HVAC unit or a system as described before.

Embodiments relates also to a method for mixing air for a vehicle HVAC (heating, ventilation, air-conditioning) component. The method comprises the operations of:

providing outdoor air from an exterior space of the vehicle through a first inlet by controlling a first fan;

providing indoor air from an interior space of the vehicle through a second inlet by controlling a second fan;

providing a mixing zone, where outdoor and indoor air are mixed together, air temperature is equalized and the air speed is made even within the resulting air stream;

controlling the first fan and/or the second fan to provide downstream of the first fan and of the second fan a desired mix of air to the vehicle HVAC component).

Optionally, the controlling can be performed by controlling a voltage signal provided to the first fan and/or to the second fan. This simple control is, e.g., possible if electronically commutated fans with brushless direct current motors are employed.

Optionally, the controlling of the first fan and/or of the second fan results in a higher air flow processed by the second fan than by the first fan. Therefore, the second fan can be arranged downstream the vehicle HVAC component, whereas the second inlet is arranged upstream the vehicle HVAC component. In this embodiment, the mixing zone can directly be connected to the first fan and the second inlet. In addition, the first and/or second fans may be controlled to ventilate air out of the second inlet into an exemplary passenger compartment by using the first fan.

Embodiments solve at least some of the above-mentioned problems by an arrangement where air dampers are eliminated and the flow rate control is achieved in a more efficient way by replacing dampers by at least two fans through inlets that may have fixed apertures.

Figure 1:
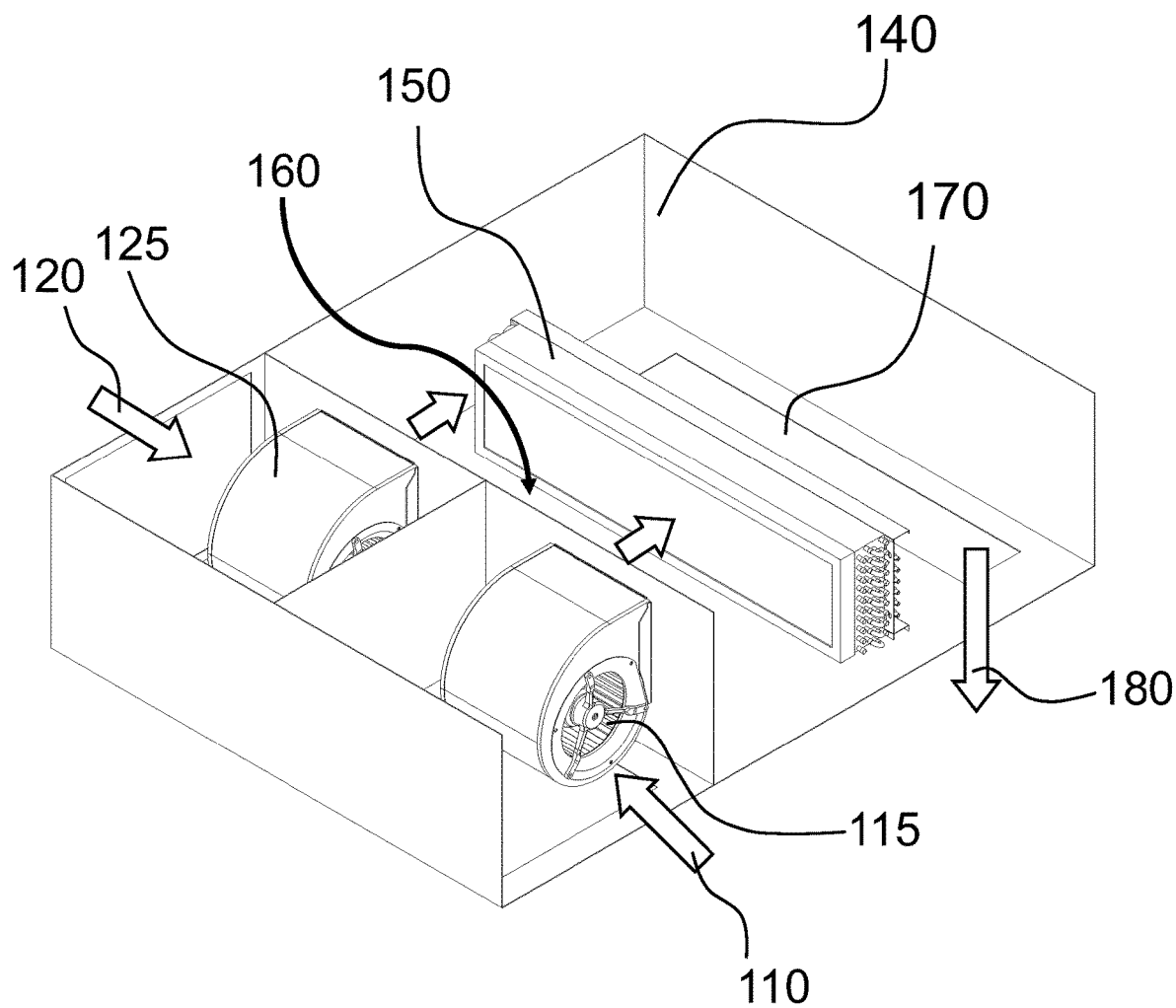
FIG. 1 depicts a system for mixing air for a vehicle HVAC component according to at least one disclosed embodiment.

FIG. 1 depicts a system according to an embodiment for mixing air for a vehicle HVAC (heating, ventilation, air-conditioning) component 150. The system comprises a first inlet 110 for outdoor air from an exterior space of the vehicle. The first inlet 110 is in communication with a first fan 115 to control an outdoor air inflow. The system further comprises a second inlet 120 for indoor air from an interior space of the vehicle, which is in communication with a second fan 125 to control an indoor air inflow. The first fan 115 and the second fan 125 are independently controllable to provide a desired mix of air.

The whole depicted system with the HVAC component 150 can be a HVAC unit or is a part thereof. It is accommodated in a housing 140 and the vehicle HVAC component 150 may be a heat component, an evaporator, a ventilation, an air-conditioning component or a filter or a heat exchanger or some other component used in the HVAC unit. The air from the first fan 115 and/or the second fan 125 is mixed in a mixing zone 160, which is upstream of the HVAC component 150 and downstream from the first and second fans 115, 125. After passing the HVAC component 150 the air is released by a supply opening 170 to a vehicle compartment as a supply airstream 180. The first fan 115 and/or the second fan 125 may or may not be arranged within separate compartments and depending on where the air is introduced in the first and second fans 115, 125, respective openings (e.g. in opposite positions) are provided in the housing 140.

In particular, if the first and second fans 115, 125 do not achieve an efficient mixing of air by their constructions and/or orientations, the mixing zone 160 is formed sufficiently long (e.g. more than 15 cm) to enable a mixing of indoor and outside air before the mixed air enters the HVAC component 150. Moreover, according to further embodiments the first and second fans 115, 125 may have respective blow directions that cross each other before entering the HVAC component 150 to achieve the desired mixing by turbulences of warm (outside) air and cold (indoor) air. As a result, the HVAC component 150 will receive a homogenous inflow of air (and not warm air on one side and cold air on the other side). This improves efficiency and/or avoids concentration of water in some parts of the HVAC component 150.

The share of outdoor and indoor air is determined by the individual paths encountered by each air stream before reaching the mixing zone 160 and by the individual characteristic of first fan 115 and the second fan 125. The total amount of moved air (sum of outdoor air and indoor air) depends on:
 the individual paths of the two air streams,
 the path after the mixing zone 160,
 the characteristics of the employed fans 115, 125, and
 the paths after the fans 115, 125.

The system may further comprise a control unit (not in the figures) to control the fans accordingly. This control unit may be accommodated in the housing 140 or is connected to the HVAC unit, e.g. via a vehicle bus.

Figure 2:
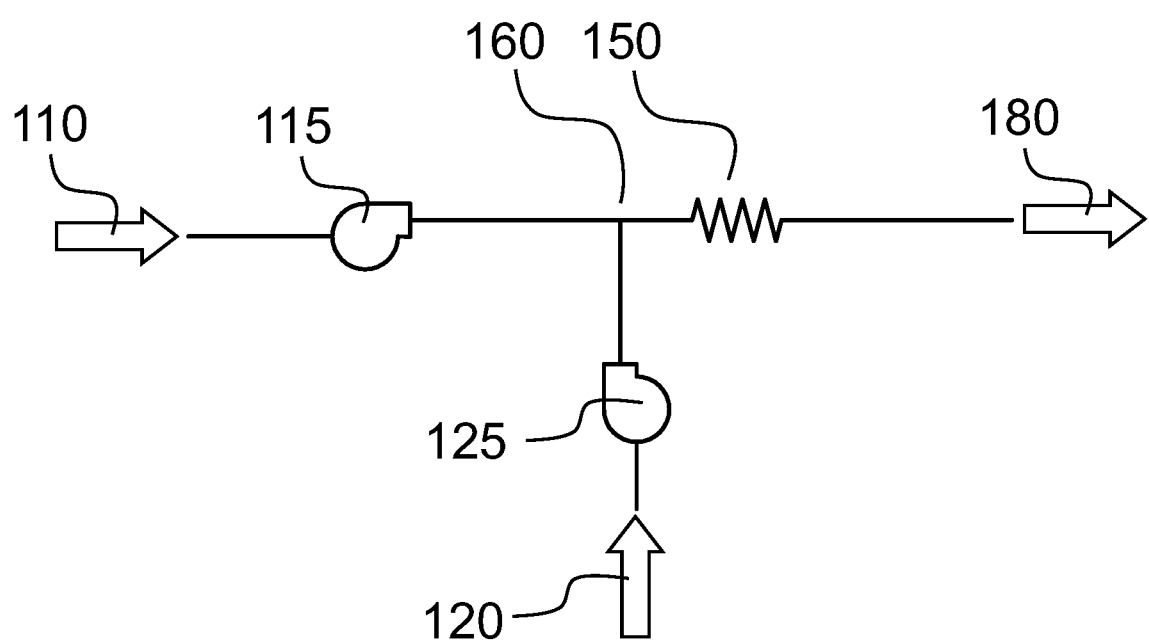
FIG. 2 illustrates the design of the system according to disclosed embodiments.

FIG. 2 illustrates the advantages of the design of the system according to disclosed embodiments. A disadvantage of the conventional design relates to the fact that the control of the outside air and the inside air is not sufficient, because the dampers may still provide more outside air or inside air than desired. Due to the pressure drops in the system, the fans 56 had to work against the multiple resistances 52, 53, 55 which resulted in an increased load on the fans 56 (see FIG. 7).

In comparison to the conventional design, embodiments replace the dampers 52 and 53 by respective fans 115, 125. Therefore, the fans 56 at the outlet 58 are no longer needed. The air flow is instead controlled directly by controlling fans 115, 125. This provides an improved control over the amount of air which is provided from the outside 110 or from the inside 120. Hence, only the flow resistance 150, associated to various components such as filters, heat exchangers and electrical resistance etc., is still present, whereas the other resistances 52 and 53 of FIG. 7 are missing. It is understood that this does not mean that indoor air and outdoor air paths may not encounter additional resistances, but their influence is rather small compared to the dampers and the flow resistance 150.

If, for example, the amount of outdoor air shall be controlled in the system according to embodiments, only the rotation speed of the outdoor air fan 115 (first fan) is varied. Different technologies are available to allow for fan speed variations and the respective control. In the case of electronically commutated fans with brushless direct current motors, most of the control hardware is integrated in the fan and allows for a compact, light design similar to what is shown in FIG. 1. An exemplary decreasing of the fan speed has two effects: on one hand decreases the outdoor air flow 110 and, on the other hand, it decreases the electrical consumption of the first fan 115. Compared hereto, in the conventional system of FIG. 8 a decrease of the outdoor air flow is achieved by (partly) closing the damper 52. This will, however, have no decrease of the energy consumption, because the fans 56 have to work against the partly closed damper 52.

Figure 3:
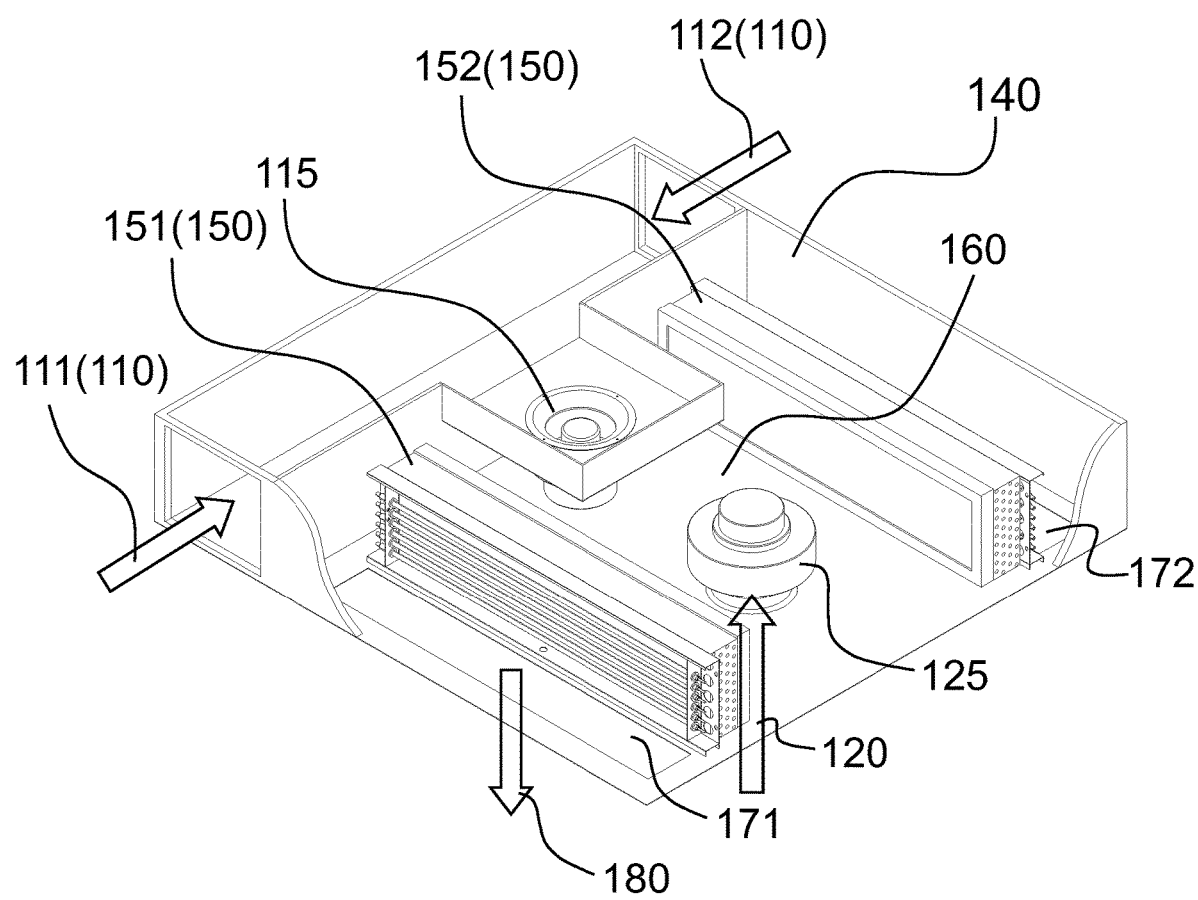
FIG. 3 depicts a system for mixing air according to at least one embodiment.

FIG. 3 depicts a system for mixing air according to another embodiment, which again is part of the HVAC unit included in the housing 140 as shown in FIG. 3. In this embodiment the first inlet 110 includes a first opening 111 and a second opening 112, each of which are in communication with each other and with the first fan 115. The inlets 110, 120 may be opposite to each other, e.g. at a lateral side of the housing 140. In this embodiment the first fan 115 is configured to obtain the air in an axial direction and to release it in a radial direction. In addition, in this embodiment the at least one component 150 of the HVAC unit includes a first component 151 and a second component 152 which receive air from the mixing zone 160 and release resulting air through two openings 171, 172 to the one or more compartments of the vehicle. The mixing zone 160 is again in communication with the second fan 125 to receive air from the inside of the vehicle. A desired mixing of air is again achieved by controlling the first fan 115 and the second fan 125 accordingly. The impellers of the first and second fans 115, 125 promote the mixing of the air streams in the mixing zone 160 and create an even distribution of air speed in the air streams passing through the first and second HVAC components 151, 152.

Figure 4:
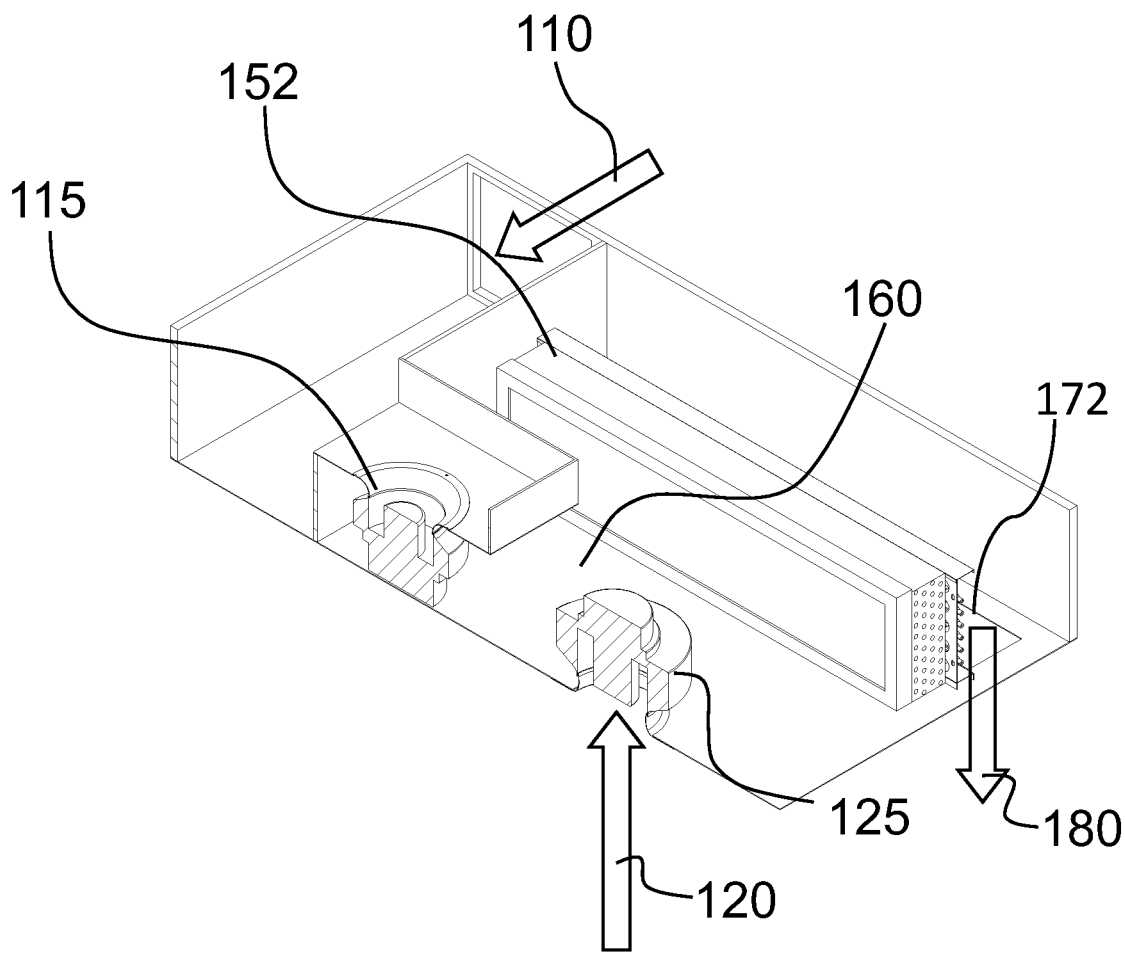
FIG. 4 depicts a cross-sectional view through the system of FIG. 3.

FIG. 4 depicts a cross-sectional view through the first fan 115 and the second fan 125 of the embodiment of FIG. 3. Both fans 115, 125 may be formed as backward curved fans. However, the presently disclosed embodiments are not be limited to backward curved fans. Instead, also axial fans or mixed flow fans can be used in the system according to other embodiments, as long as the shape of the blades promote the right mixing between indoor and outdoor air, and avoids areas of too low or too high air speed in the first and second HVAC components 151, 152. Too low speed can result in the HVAC components 151, 152 not working efficiently, too high speed can lead to unwanted water carry over during air de-humidification in devices included in the HVAC component, such as evaporator coils.

In the embodiment of FIG. 4, outdoor air 110 enters from both sides of the exemplary HVAC unit, sucked by the outdoor air fan 115 (first fan), which blows the air into the mixing region 160. Indoor air 120 enters from the bottom of the HVAC unit, directly into the inlet of the indoor fan 125 (second fan). This fan blows indoor air into the mixing region 160, where outdoor and indoor air are mixed together. From the plenum of the mixing region 160, air flows through the assemblies 150 (HVAC components) and through the supply opening 172, 171. Downstream of the openings 172 and 171, supply air 180 is supplied to the compartment through ducting and distribution system (not shown in FIG. 4).

Figure 5:
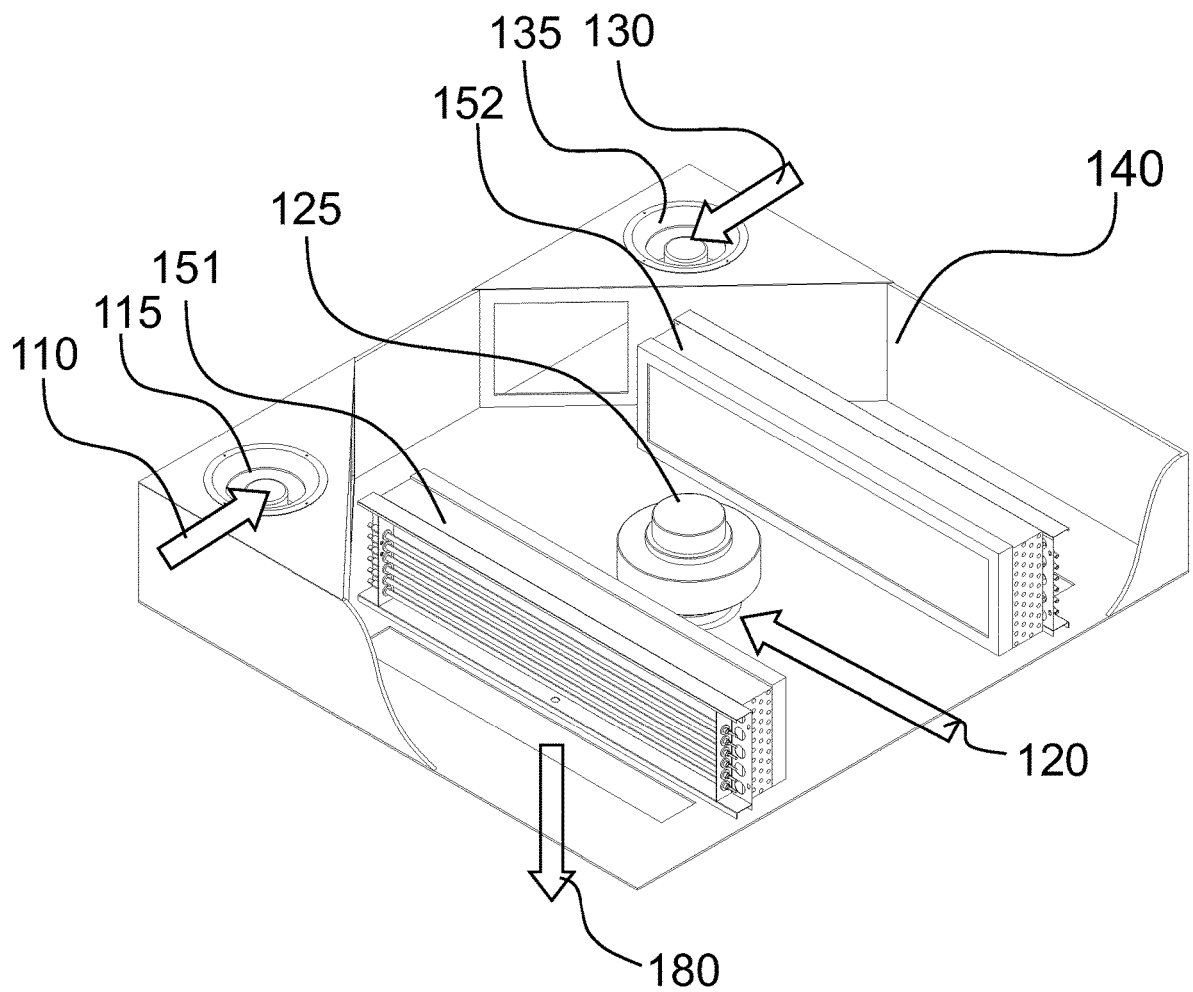
FIG. 5 depicts at least one embodiment for the system of mixing air as part of a HVAC unit.

FIG. 5 depicts yet another embodiment which is different from the embodiment of FIG. 3 in that, in addition to the first fan 110 for providing outdoor air, a third fan 135 is provided which is in communication with a third inlet 130 to provide an outdoor air inflow. The first fan 115 and the third fan 135 provide the outdoor air to the mixing zone 160 which again is in communication with the second fan 125 to provide indoor air of the vehicle. All remaining components are arranged in the same way as described previously. The resulting supply air 180 is again supplied to one or more vehicle compartments.

According to this embodiment, two backward curved fans, the first fan 115 and the third 135, are dedicated to outdoor air, another backward fan, the second fan 125, is dedicated to indoor air. Outdoor air enters from both sides of the HVAC unit, sucked by the outdoor air fans 115, 135 which blow the air into the mixing region 160. Indoor air enters again from the bottom of the HVAC unit, directly into the inlet of the indoor fan 125. This fan 125 blows indoor air into the mixing region 160, where outdoor and indoor air are mixed together. The main difference between this arrangement and the one shown in FIG. 1 or 3 is the number of outdoor air fans and the access of outdoor air 110, 130 from the top of the housing 140 to the outdoor fans 115, 135.

According to this exemplary embodiment, the height of the unit can be quite low (less than 300 mm), as the accesses to outdoor and indoor air fans are placed respectively on unit top and bottom. The operation can be similar to the one described for the embodiment of FIG. 3. Higher heights are easily obtainable following the same design principles. The individual quantities of indoor and outdoor air may vary depending on the need of air volume replacement inside passengers' compartment and heat gain or loss that have to be balanced by the AC system. For example, during standard operation, the amount of outdoor air may be in the range of 300 to 1400 m3/h, of the indoor air in the range of 2000 to 3000 m3/h and the air supplied to the compartment may be in the range of 3000 to 4000 m3/h. If the occupation of the compartment is high, the outdoor air may be equal to 1200 m3/h, the indoor air equal to 2800 m3/h and the total air flow supplied to the compartment would be equal to 4000 m3/h. In case the occupation of the compartment is reduced, the outdoor air may be in the range from 0 to 1200 m3/h, the indoor air may be in the range of 3400 to 2800 m3/h and the air supplied to the compartment may be in the range of 3400 to 4000 m3/h.

To vary the individual air quantities, the rotational speeds of the fans 115, 125, 135 are varied. It is also possible to vary only the rotational speed of the outdoor fan 115, or of the indoor fan 125, or of the outdoor fan 125 and of the indoor fan 115 (e.g. independently). One option to easily change fan rotational speed is to employ electronically commutated fans with brushless direct current motors. A control signal (usually a varying voltage) is sent to each fan independently and the speed of each fan is varied in order to achieve a certain balance of the system and certain individual flow rates.

Other modes of operation are achievable according to further embodiments. Either the outdoor fan(s) 115, 135 or the indoor fan 125 can be turned off, leaving only one fan working in the system. For instance, at system start up, when no passengers are in the compartment, outdoor fan(s) 115, 135 are turned off and the indoor fan 125 can work at full speed to rapidly cool down or heat up the compartment. On the other hand, in case of a fire inside the compartment or failure of the AC system, the indoor fan 125 can be turned off and the outdoor fan(s) 115, 135 can work at full speed. Furthermore, if outdoor temperature is mild and compartment's occupation is high, the system can balance the internal heat loads just by using mainly outdoor fan 115, 135 and reduce the rotation speed of the indoor fan 125.

Figure 6:
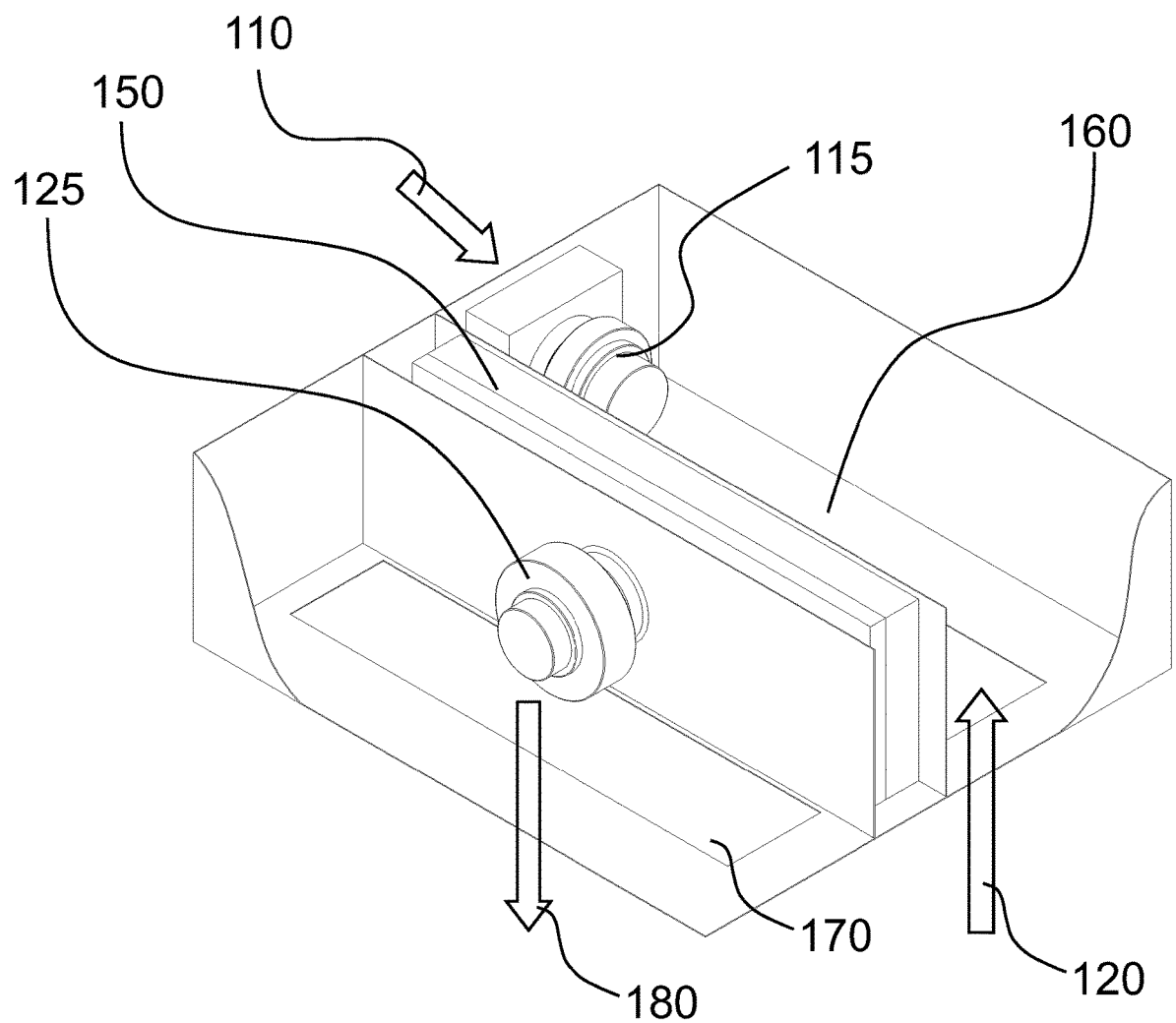
FIG. 6 depicts at least one embodiment for the system of mixing air as part of a HVAC unit.

FIG. 6 depicts yet another embodiment which is different from the embodiment of FIG. 3 in that the second fan 125 is in communication with the second inlet 120 for indoor air and with the outlet of the first fan 115. The first fan 115 carries outside air 110, while the second fan 125 carries both outdoor and indoor air. The first and second fans 115, 125 are located on one level, within the same housing, allowing a compact and low height unit design. The mixing zone 160 can be downstream of the first fan 115, in communication with the second inlet 120 for indoor air, and upstream of the inlet of second fan 125. Furthermore, the HVAC component 150 is upstream of the inlet of the second fan 125, which is sucking mixed indoor and outdoor air. After passing the HVAC component 150 the air is released by a supply opening 170 to a vehicle compartment as a supply airstream 180. Again indoor and outdoor air can be variated in a wide range of flow rates.

An advantage of this embodiment relates to the possibility to supply outside air directly through the second inlet into the indoor region without passing through the HVAC component. Therefore, there is less resistance when supplying outside air directly to the interior. In this embodiment, the second fan 125 is usually more powerful than the first fan 115 to process the larger air volume flow rate and to prevent air from being blown directly into interior, if desired.

Disclosed embodiments may provide, in particular, the following advantages:

only few components are to be installed to have an automated system;

dampers or shutters are not needed, the first and second inlets 110, 120 may instead have fixed apertures;

the weight is lowered compared to the conventional system;

the fans and the openings are arranged in order to have a compact design and reduce unit height;

the regulation/controlling of the system is straightforward, since there are no pressure drop variations—instead the air is pushed through the system;

the fans do not have to work against varying resistances, the stress on system is lower;

the system can be controlled over a wide range of air streams; the target flowrates can be easily achieved;

the complete mixing of outdoor and indoor air streams is achieved in the mixing zone and an uniform air flow reaches the HVAC component, which ensures the efficient operation of elements such as heat exchangers included in the HVAC component; and the energy consumption corresponds directly to the amount of air moving through the system so that a decrease in the outdoor or indoor air stream directly results in decrease of the fan power consumption.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, e.g., a particular feature descripted in one embodiment may also be realized in other embodiments. Such combinations are covered by the disclosure herein unless it is stated that a specific combination is not intended.

LIST OF REFERENCE SIGNS 50 vehicle (e.g. a railway vehicle)
51 outdoor air stream
52 outdoor air damper
53 indoor air damper
54 mixing zone
57 indoor air stream
56 fan(s)
110 first inlet
115 first fan
120 second inlet
125 second fan
111, 112 openings in communication with the first fan
130 third inlet
135 third fan
140 housing
55, 150 HVAC (heating, ventilation, air-conditioning) component
160 mixing zone
170, 171, 172 supply opening(s)
58, 180 supply air
511 exhaust air

The invention claimed is:

1. A system for mixing air for a vehicle heating, ventilation, air-conditioning (HVAC) component, the system comprising:
a first inlet for outdoor air from an exterior space of the vehicle;
a first fan in communication with the first inlet to control only an air inflow through the first inlet;
a second inlet for indoor air from an interior space of the vehicle;
a second fan in communication with the second inlet to control an air inflow through the second inlet, wherein the first fan and the second fan have a fixed aperture;
vehicle HVAC components, wherein the components include two heat exchangers,
a control unit configured to independently control the first fan and the second fan to provide a desired mix of air to the vehicle HVAC components;
a housing for accommodating at least the first fan, the second fan, and the HVAC component;
a mixing zone arranged inside the housing downstream of the first fan and the second fan and upstream and between the HVAC components, the mixing zone configured to mix the air from the first fan and the second fan; and
two supply openings for supplying an output of the HVAC components to a vehicle compartment, each of the two supply openings in communication with one of the two heat exchangers and connected to one or more vehicle compartments,
wherein the first fan and the second fan are located between the two heat exchangers.

2. The system of claim 1, wherein the first inlet comprises at least a first opening and a second opening, which are each in communication with the first fan.

3. The system of claim 1, wherein the first fan and/or the second fan and/or the third fan are electronically commutated and include at least one brushless direct current motor.

4. A vehicle heating, ventilation, air-conditioning (HVAC) unit comprising:
at least one HVAC component;
the system for providing a mix of air to the at least one HVAC component of claim 1; and
at least one supply opening for supplying an output of the HVAC components to a vehicle compartment.

5. The vehicle HVAC unit of claim 4, wherein the at least one HVAC component includes one or more of the following: a heater, an evaporator, a heat exchanger, a vent, an air-conditioner, an air filter.

6. The vehicle HVAC unit of claim 4 wherein:
the at least one HVAC component comprises two same or different components; and
the at least one supply opening comprise two openings, each of which in communication with one of the two HVAC components and connected to one or more vehicle compartments.

7. A railway vehicle comprising the vehicle HVAC unit of claim 4.

8. A method for mixing air for a vehicle heating, ventilation, air-conditioning (HVAC) components, the method comprising:
providing outdoor air from an exterior space of the vehicle through a first inlet by controlling a first fan;
providing indoor air from an interior space of the vehicle through a second inlet by controlling a second fan; wherein the first fan and the second fan have a fixed aperture;
controlling the first fan and the second fan to provide downstream of the first fan a desired mix of air to the vehicle HVAC components in a mixing zone arranged inside a housing downstream of the first fan and the second fan and upstream and between the HVAC components, the mixing zone configured to mix the air from the first fan and the second fan, wherein the components include two heat exchangers; and
supplying an output of the HVAC components via two supply openings to a vehicle compartment, each of the two supply openings in communication with one of the two heat exchangers and connected to one or more vehicle compartments, wherein the first fan and the second fan are located between the two heat exchangers.

9. The method of claim 8, wherein the controlling operation is performed by controlling a voltage signal provided to the first fan and/or another voltage signal provided to the second fan.

10. The system of claim 1, wherein the mixing zone is a length configured to enable a homogeneous mixture of the air to be formed, or the first and second fans are oriented for first and second fan blow directions to cross each other.

11. The method of claim 8, wherein the mixing zone is a length configured to enable a homogeneous mixture of the air to be formed, or the first and second fans are oriented for first and second fan blow directions to cross each other.

* * * * *